United States Patent
Lu

(10) Patent No.: US 10,841,722 B2
(45) Date of Patent: Nov. 17, 2020

(54) AUDIO SIGNAL INTERFACE CIRCUIT, AND CONTROL METHOD, APPARATUS AND TERMINAL THEREOF

(71) Applicant: BOE Technology Group Co., Ltd., Beijing (CN)

(72) Inventor: Yongjie Lu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/429,569

(22) Filed: Jun. 3, 2019

(65) Prior Publication Data

US 2020/0107146 A1    Apr. 2, 2020

(30) Foreign Application Priority Data

Sep. 27, 2018   (CN) .......................... 2018 1 1129806

(51) Int. Cl.
| | |
|---|---|
| *H04S 7/00* | (2006.01) |
| *G10L 19/008* | (2013.01) |
| *H04R 5/02* | (2006.01) |
| *H04R 5/04* | (2006.01) |
| *H04S 3/00* | (2006.01) |

(52) U.S. Cl.
CPC .............. *H04S 7/30* (2013.01); *G10L 19/008* (2013.01); *H04R 5/02* (2013.01); *H04R 5/04* (2013.01); *H04S 3/008* (2013.01); *H04R 2499/13* (2013.01); *H04S 2400/01* (2013.01)

(58) Field of Classification Search
CPC .... H04R 29/001; H04R 2499/13; H04R 3/00; H04R 3/12
USPC ................................. 381/59, 86, 22
See application file for complete search history.

(56) References Cited

U.S. PATENT DOCUMENTS

| | | | |
|---|---|---|---|
| 2006/0218327 A1* | 9/2006 | Lee ........................ | G06F 1/3215 710/107 |
| 2012/0188456 A1* | 7/2012 | Kuroyanagi ........... | H04N 5/765 348/569 |
| 2015/0281831 A1* | 10/2015 | Ibusuki ................... | H03F 3/183 381/74 |

* cited by examiner

*Primary Examiner* — Alexander Krzystan
(74) *Attorney, Agent, or Firm* — Fay Sharpe LLP

(57) ABSTRACT

The present disclosure provides an audio signal interface circuit, and a control method, apparatus and terminal thereof, in the technical field of electronic technologies. The audio signal interface circuit includes a detection sub-circuit and a control sub-circuit. The detection sub-circuit may control, under control of a control signal, the control sub-circuit, to enable an audio signal interface to be communicated with an audio signal input terminal or an audio signal output terminal of a decoder chip. That is, the audio signal interface circuit enables the audio signal interface to not only implement input of audio signals, but also implement output of audio signals.

21 Claims, 9 Drawing Sheets

AUDIO SIGNAL INTERFACE CIRCUIT, AND CONTROL METHOD, APPARATUS AND TERMINAL THEREOF

This application claims priority to Chinese Patent Application No. 201811129806.5, filed on Sep. 27, 2018 and entitled "AUDIO SIGNAL INTERFACE CIRCUIT AND, APPARATUS, CONTROL METHOD AND DISPLAY DEVICE", the entire contents of which are incorporated herein by reference.

TECHNICAL FIELD

The present disclosure relates to the technical field of electronics, and particularly to an audio signal interface circuit and a control method, apparatus and terminal thereof.

BACKGROUND

A terminal is generally configured with an audio and video signal interface. The audio and video signal interface may receive video signals and audio signals transmitted by other terminals.

In the related art, the audio and video signal interface configured in a terminal is generally a high definition multimedia interface (HMDI). The HDMI may firstly transmit received audio and video signals to a decoder chip configured to decode audio and video signals. The decoder chip may decode the audio signals among the audio and video signals and then output the decoded audio signals to a headphone interface, and may decode the video signals among the audio and video signals and output the decoded video signals to a display module, thereby implementing play of the audio and video signals.

SUMMARY

The present disclosure provides an audio signal interface circuit and a control method, apparatus and terminal thereof. The technical solutions are as follows.

In an aspect, there is provided an audio signal interface circuit, comprising: a detection sub-circuit and a control sub-circuit; wherein the detection sub-circuit is connected to a control signal terminal, a first power source terminal, a second power source terminal and a control terminal of the control sub-circuit respectively, and the detection sub-circuit is configured to, under control of a control signal provided by the control signal terminal, output a first power source signal from the first power source terminal or a second power source signal from the second power source terminal to the control terminal of the control sub-circuit; and the control sub-circuit is further connected to an audio signal interface, and an audio signal input terminal and an audio signal output terminal of a decoder chip respectively, and the control sub-circuit is configured to control the audio signal interface to be connected to the audio signal input terminal under control of the first source power signal, and control the audio signal interface to be connected to the audio signal output terminal under control of the second power source signal.

Optionally, the control sub-circuit comprises: at least one control chip; wherein an input/output pin of the control chip is connected to the audio signal interface; an output pin of the control chip is connected to the audio signal input terminal, and an input pin of the control chip is connected to the audio signal output terminal; and an enable pin of the control chip is connected to an output terminal of the detection sub-circuit as the control terminal.

Optionally, the control sub-circuit further comprises: at least one capacitor in a one-to-one correspondence with the at least one control chip; wherein one terminal of each of the at least one capacitor is connected to the input pin of the corresponding control chip, and the other terminal of each of the at least one capacitor is connected to the audio signal output terminal.

Optionally, the audio signal interface comprises a left-channel interface and a right-channel interface; the audio signal input terminal comprises a left-channel input terminal and a right-channel input terminal, and the audio signal output terminal comprises a left-channel output terminal and a right-channel output terminal; and the control sub-circuit comprises two control chips; wherein the input/output pin of one of the control chips is connected to the left-channel interface, and the output pin of the control chip is connected to the left-channel input terminal, and the input terminal of the control chip is connected to the left-channel output terminal; and the input/output pin of the other of the control chips is connected to the right-channel interface, and the output pin of the control chip is connected to the right-channel input terminal, and the input pin of the control chip is connected to the right-channel output terminal.

Optionally, the control sub-circuit further comprises: two capacitors; one terminal of one of the capacitors is connected to an input pin of one of the control chips, and the other terminal of the capacitor is connected to the left-channel output terminal; and one terminal of the other of the capacitors is connected to an input pin of the other of the control chips, and the other terminal of the capacitor is connected to the right-channel output terminal.

Optionally, a first power source pin of each control chip is connected to the first power source terminal, and a second power source pin of each control chip is connected to the second power source terminal.

Optionally, the detection sub-circuit comprises: a switch transistor and a first resistor; wherein a gate of the switch transistor is connected to the control signal terminal, a first electrode of the switch transistor is connected to the second power source terminal, and a second electrode of the switch transistor is connected to the control terminal of the control sub-circuit; and one terminal of the first resistor is connected to the second electrode of the switch transistor, and the other terminal of the first resistor is connected to the first power source terminal; wherein the first electrode and the second electrode are one of a source and a drain, respectively.

Optionally, the detection sub-circuit comprises: a second resistor; wherein one terminal of the second resistor is connected to the control signal terminal, and the other terminal of the second resistor is connected to the gate of the switch transistor.

Optionally, the control sub-circuit comprises two control chips; and the detection sub-circuit comprises two switch transistors; wherein the second electrode of one of the switch transistors is connected to the enable pin of one of the control chips, and the second electrode of the other of the switch transistors is connected to the enable pin of the other of the control chips.

Optionally, the circuit further comprises: an interface sub-circuit; wherein the interface sub-circuit is connected to the input terminal of the control sub-circuit and the audio signal interface respectively, and is configured to implement at least one of functions of impedance matching and current limiting.

Optionally, the interface sub-circuit comprises: a third resistor and a fourth resistor; wherein one terminal of the third resistor is connected to the audio signal interface, and the other terminal of the third resistor is connected to the control sub-circuit and one terminal of the fourth resistor; and the other terminal of the fourth resistor is connected to the second power source terminal.

Optionally, the audio signal interface comprises: a left-channel interface and a right-channel interface; the control sub-circuit comprises: two control chips; and the interface sub-circuit comprises: two third resistors and two fourth resistors; wherein one terminal of one of the third resistors is connected to the left-channel interface, and the other terminal of the third resistor is connected to the input/output chip of one of the control chips and one terminal of one of the fourth resistors respectively; and one terminal of the other of the third resistors is connected to the right-channel interface, and the other terminal of the third resistor is connected to the input/output chip of the other of the control chips and one terminal of the other of the fourth resistors respectively.

In another aspect, there is provided a control method of an audio signal interface circuit, comprising: detecting whether input signals received via an audio and video signal interface comprise an audio signal; providing a control signal at a first potential to a control signal terminal when the input signals comprise an audio signal, wherein the audio signal interface circuit controls, under control of the control signal, an audio signal interface to be connected to an audio signal output terminal of a decoder chip; and providing a control signal at a second potential to the control signal terminal when the input signals do not comprise audio signals, wherein the audio signal interface circuit controls, under control of the control signal, the audio signal interface to be connected to an audio signal input terminal of the decoder chip.

In yet another aspect, there is provided a decoder chip, comprising: a memory, a processor and computer programs that is stored in the memory and executable by the processor; wherein the computer programs, when executed by the processor, implement the method described in the above aspect.

In still yet another aspect, there is provided an audio signal interface apparatus, comprising: the decoder chip described in the above aspect, and the audio signal interface circuit described in the above aspect connected to the decoder chip.

In still yet aspect, there is provided a terminal, comprising: the audio signal interface apparatus described in the above aspect, a loudspeaker, an audio signal interface and an audio and video signal interface; wherein the loudspeaker is connected to an audio signal output terminal of a decoder chip in the audio signal interface apparatus; and the audio and video signal interface is connected to an audio and video signal input terminal of the decoder chip.

Optionally, the terminal is a vehicle-mounted display device.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
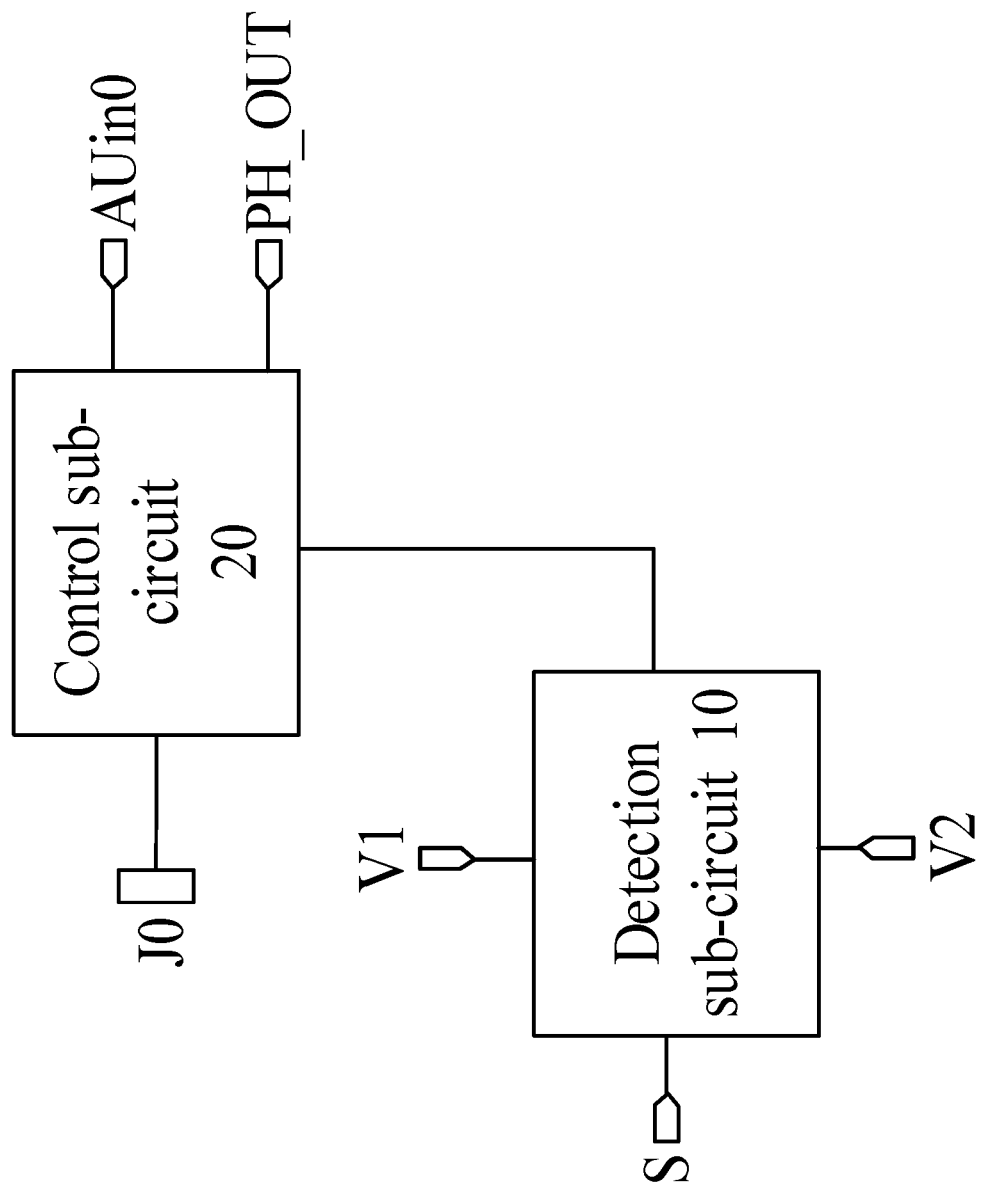
FIG. 1 is a schematic structural diagram of an audio signal interface circuit according to an embodiment of the present disclosure.

The embodiments of the present disclosure will be described in further detail with reference to the accompanying drawings, to present the objects, technical solutions, and advantages of the present disclosure more clearly.

In some application scenarios, the audio and video signal interface (for example, an HDMI) configured in a terminal may fail to receive audio signals or may receive signals containing no audio and video signal. In this case, signals output by the audio and video signal interface to a decoder chip of the terminal only include video signals, but include no audio signal.

For example, when a transmitter terminal and a receiver terminal are both configured with an HDMI, and when the HDMIs configured in the transmitter terminal and the receiver terminal are connected to each other, the HDMI of the receiver terminal can generally receive the audio and video signals. However, when the receiver terminal is a vehicle-mounted display (for example, a 21.5-inch vehicle-mounted display), a long HDMI signal line (for example, 30 meters) may be needed to connect the HDMIs of the two terminals, to transmit the audio and video signals of the transmitter terminal to the vehicle-mounted display. An effective transmission distance of the audio signals between HDMIs is generally very short, for example, may be only 10 m. Therefore, when the transmission distance is long, the HDMI of the transmitter terminal may only transmit the video signals to the vehicle-mounted display, but may fail to transmit the audio signals to the vehicle-mounted display. In this case, the signals received by the HDMI of the receiver terminal (for example, a vehicle-mounted display) do not include the audio signals.

Alternatively, when the transmitter terminal is only configured with an interface for transmitting the video signals, for example, a video graphics array (VGA) interface or a digital visual interface (DVI), if the HDMI of the receiver terminal is connected to the interface for transmitting the video signals of the transmitter terminal, the HDMI of the receiver terminal fail to receive the audio signals.

An embodiment of the present disclosure provides an audio signal interface circuit. The audio signal interface circuit may control an audio signal interface (for example, a headphone interface) of a terminal to be connected to an audio signal input terminal of a decoder chip when the audio and video signal interface (for example, an HDMI) configured in the terminal fails to receive audio signals or receives signals containing no audio signal, such that the audio signals may be received via the audio signal interface, that is, implementing input of the audio signals. In addition, when the audio signals are received or signals containing the audio signals are received by the audio and video signal interface, the audio signal interface circuit may control the audio signal interface to be connected to the audio signal output terminal of the decoder chip, such that the audio signals are played via the audio signal interface, that is, implementing output of the audio signals.

FIG. 1 is a schematic structural diagram of an audio signal interface circuit according to an embodiment of the present disclosure. As illustrated in FIG. 1, the circuit may include a detection sub-circuit 10 and a control sub-circuit 20.

Referring to FIG. 1, the detection sub-circuit 10 may be connected to a control signal terminal S, a first power source terminal V1, a second power source terminal V2 and a control terminal of the control sub-circuit 20 respectively. The detection sub-circuit 10 may, under control of a control signal provided by the control signal terminal S, output a first power source signal from the first power source terminal V1 or a second power source signal from the second power source terminal V2 to the control sub-circuit 20.

The control sub-circuit 20 may further be connected to an audio signal interface J0, an audio signal input terminal AUin0 and an audio signal output terminal PH_OUT of a decoder chip respectively. The control sub-circuit 20 may control, under control of the first power source signal, the audio signal interface J0 to be connected to the audio signal input terminal AUin0. In this case, the audio signal interface J0 may receive an audio signal input by the decoder chip.

The control sub-circuit 20 may further control, under control of the second power source signal, the audio signal interface J0 to be connected to the audio signal output terminal PH_OUT. In this case, the audio signal interface J0 may output the audio signal to the decoder chip.

Exemplarily, the detection sub-circuit 10 may output the second power source signal from the second power source terminal V2 to the control sub-circuit 20 when the potential of the control signal provided by the control signal terminal S is a first potential. In addition, the detection sub-circuit 10 may output the first power source signal from the first power source terminal V1 to the control sub-circuit 20 when the potential of the control signal is a second potential.

The potential of the first power source signal is the first potential, and the potential of the second power source signal is the second potential. In the embodiment of the present disclosure, the first potential may be an effective potential, the second potential may be an ineffective potential, and the first potential may be a high potential relative to the second potential. For example, the first power source terminal V1 may be a high-potential power source terminal VCC, and the second power source terminal V2 may be a low-potential power source terminal VSS or a ground terminal GND. The embodiments of the present disclosure are described by taking the scenario where the second power source terminal V2 is a ground terminal GND as an example.

Exemplarily, the potential of the first power source signal may be 5 V, and the potential of the second power source signal may be 0 V.

Optionally, the control signal terminal S may be connected to a decoder chip in a terminal, wherein the decoder chip is a chip configured to decode audio and video signals. The decoder chip may output a control signal at the first potential to the control signal terminal S when the decoder chip detects that the received signals include audio signals. The decoder chip may output a control signal at the second potential to the control signal terminal S when the decoder chip detects that the received signals include no audio signal. The potential of the control signal terminal S is automatically controlled by using the decoder chip, such that the potential of the control signal provided by the control signal terminal S may be automatically controlled. This control method is convenient, and improves user experience.

Alternatively, the control signal terminal S may be connected to a control switch, and users may control the potential of the control signal terminal S via the control switch. By arranging a control switch to control the potential of the control signal terminal S, the potential of the control signal provided by the control signal terminal S may be flexibly controlled. In the embodiment of the present disclosure, no limitation is set to the ways of controlling the control signal terminal S.

In summary, the embodiment of the present disclosure provides an audio signal interface circuit, wherein the audio signal interface circuit includes a detection sub-circuit and a control sub-circuit. The detection sub-circuit may control, under control of a control signal, the control sub-circuit, such that an audio signal interface is connected to an audio signal input terminal or an audio signal output terminal in a decoder chip. That is, the audio signal interface may not only input an audio signal to the decoder chip via the audio signal interface circuit, but also receive, via the audio signal interface circuit, an audio signal output by the decoder chip. Therefore, where an audio and video signal interface of the terminal fails to receive audio signals or receives signals containing no audio signal, the terminal may further receive the audio signal via the audio signal interface thereof, and output the audio signal to the decoder chip via the audio signal interface circuit, such that the decoder chip may play the audio signal via a loudspeaker, thereby improving the play effect of the terminal. In addition, the technical solution according to the embodiment of the present disclosure may implement input and output of the audio signals only by one audio signal interface, which saves the cost and simplifies the circuit structure.

Figure 2:
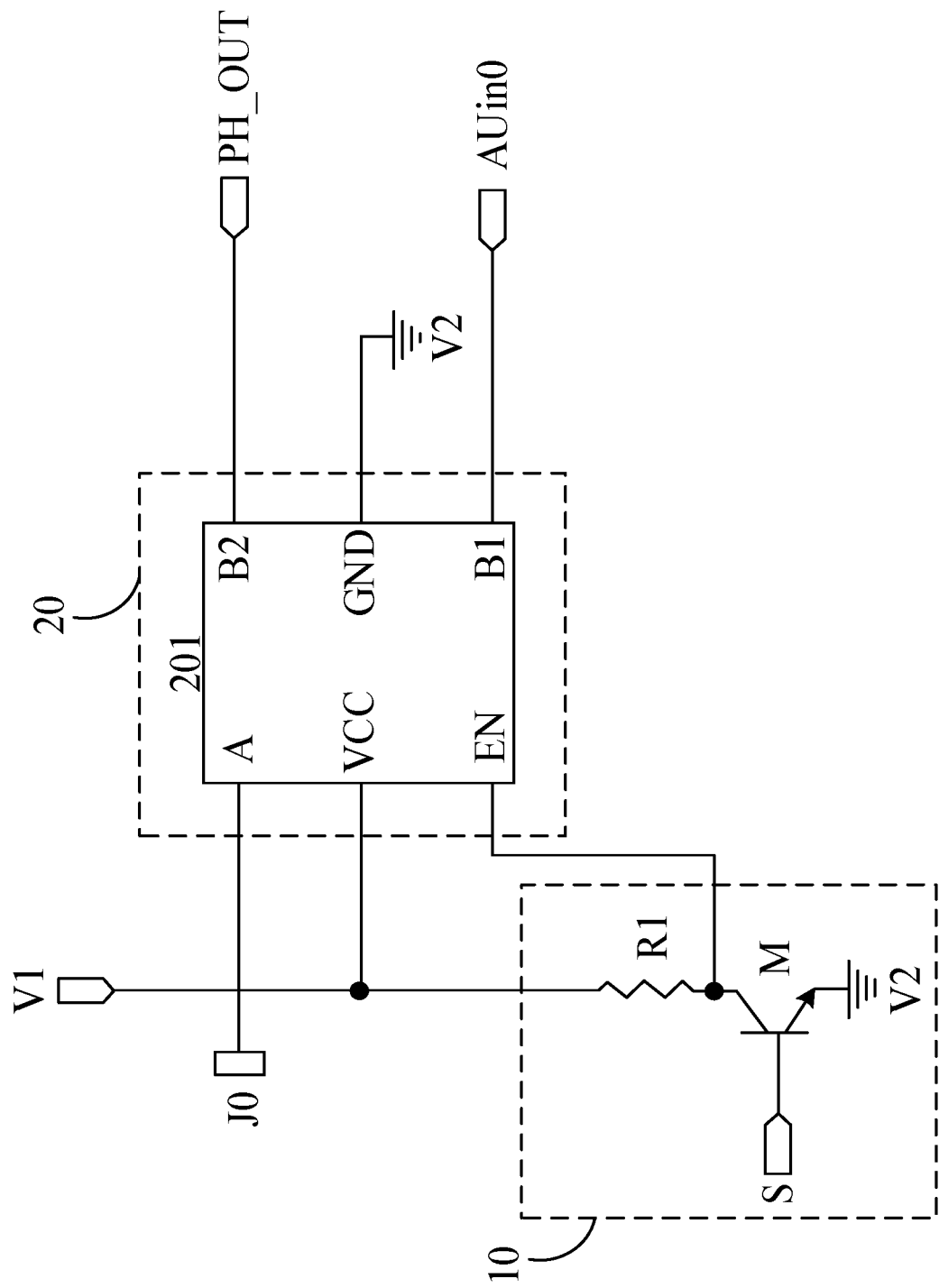
FIG. 2 is a schematic structural diagram of another audio signal interface circuit according to an embodiment of the present disclosure.

FIG. 2 is a schematic structural diagram of another audio signal interface circuit according to an embodiment of the present disclosure. As illustrated in FIG. 2, the control sub-circuit 20 may include at least one control chip 201 (FIG. 2 only illustrates one control chip 201).

As illustrated in FIG. 2, an input/output pin A of the control chip 201 may be connected to an audio signal interface J0, an output pin B1 of the control chip 201 may be connected to an audio signal input terminal AUin0, and an input pin B2 of the control chip 201 may be connected to an audio signal output terminal PH_OUT.

An enable pin EN of the control chip 201 may be connected to an output terminal of the detection sub-circuit 10 as a control terminal of the control sub-circuit 20.

Optionally, each control chip 201 may be a control chip modeled 74LVC1G3157DB. Referring to FIG. 2, it can be known that the chip of this model may include an output pin B1, an input pin B2, an input/output pin A, an enable pin EN and two power pins, totaling six pins. The control chip of this model may control, based on the potential of a signal provided by the enable pin EN, the output pin B1 or the input pin B2 to be connected to the input/output pin A.

In the embodiment of the present disclosure, the control chip 201 may also be other chips having the same function as the control chip modeled 74LVC1G3157DB. The model of the control chip 201 is not limited in the embodiment of the present disclosure.

In the embodiment of the present disclosure, the audio signal interface J0 may be a single-channel audio signal interface. The audio signal interface J0 may also be a multi-channel audio signal interface, that is, the audio signal interface J0 may include a plurality of interfaces with different channels. For example, the audio signal interface J0 may a dual-channel audio signal interface including a left-channel interface and a right-channel interface. When the audio signal interface J0 is a single-channel audio signal interface, referring to FIG. 2, the control sub-circuit 20 may include only one control chip 201.

When the detection sub-circuit 10 outputs a second power source signal at a second potential to the enable pin EN of the control chip 201, the control chip 201 may control the input pin B2 thereof to be connected to the input/output pin A thereof, that is, the control chip 201 may control the audio signal output terminal PH_OUT to be connected to the audio signal interface J0. In this case, the audio signal output terminal PH_OUT of the decoder chip may transmit an audio signal to the audio signal interface J0, and the audio signal interface J0 may implement output of the audio signal.

When the detection sub-circuit 10 outputs a first power source signal at a first potential to the enable pin EN of the control chip 201, the control chip 201 may control the output pin B1 thereof to be connected to the input/output pin A thereof, that is, the control chip 201 may control the audio signal input terminal AUin0 to be connected to the audio signal interface J0. In this case, the audio signal interface J0 may transmit an audio signal to the audio signal input terminal AUin0, and the audio signal interface J0 may implement input of the audio signal.

Figure 3:
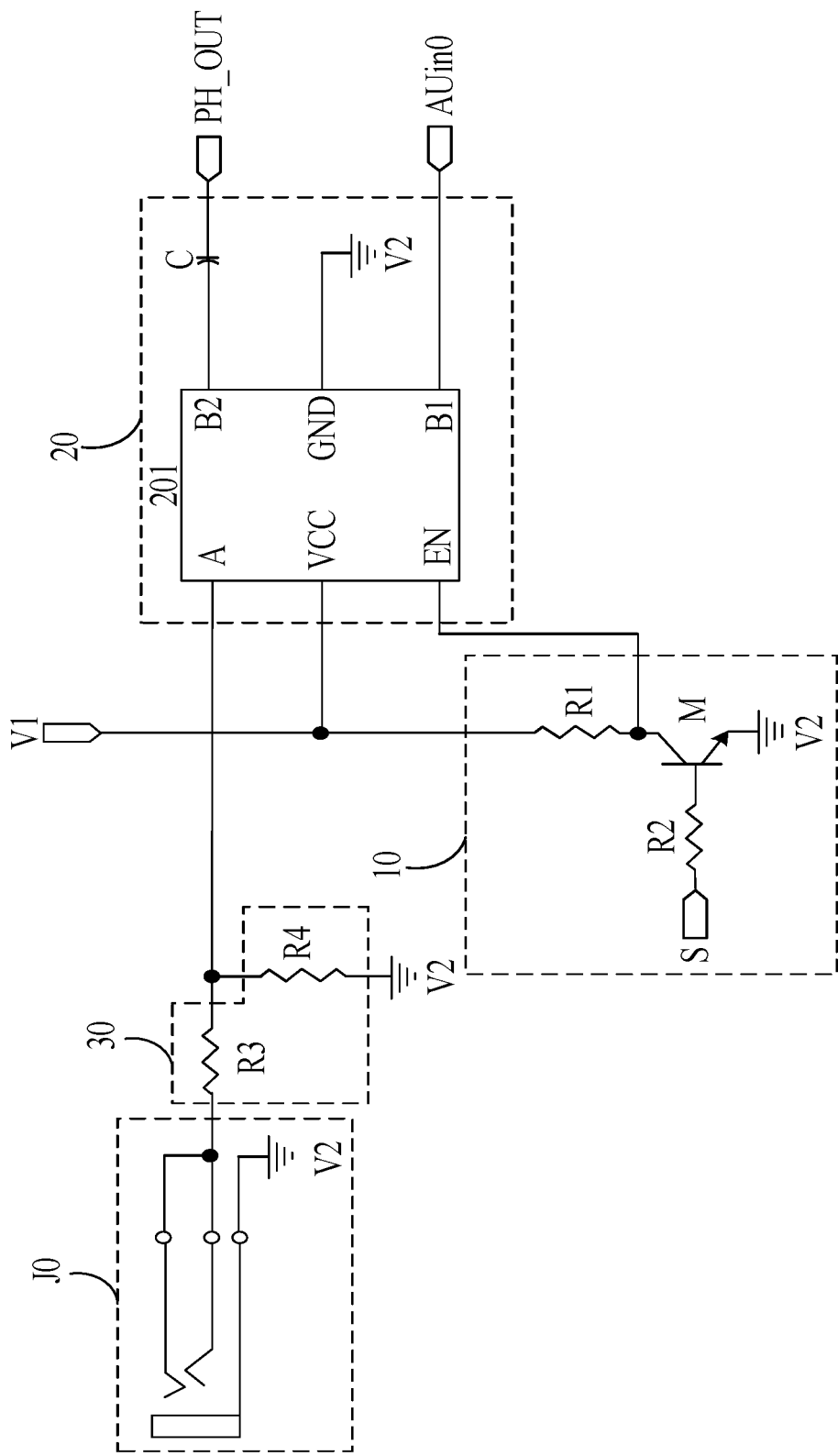
FIG. 3 is a schematic structural diagram of still another audio signal interface circuit according to an embodiment of the present disclosure.

FIG. 3 is a schematic structural diagram of still another audio signal interface circuit according to an embodiment of the present disclosure. As illustrated in FIG. 3, the control sub-circuit 20 may further include at least one capacitor C (FIG. 3 only illustrates one capacitor C) in a one-to-one correspondence with the at least one control chip 201.

One terminal of each capacitor C may be connected to the input pin B2 of the corresponding control chip 201, and the other terminal of each capacitor C may be connected to the audio signal output terminal PH_OUT.

When the audio signal interface J0 is a single-channel audio signal interface, referring to FIG. 3, the control sub-circuit 20 may include only one capacitor C. The capacitor C may be a coupling capacitor. By arranging the capacitor C, mutual signal interference may be prevented between the audio signal interface J0 and the audio signal output terminal PH_OUT, and stability of output of the audio signal may be improved.

Figure 4:
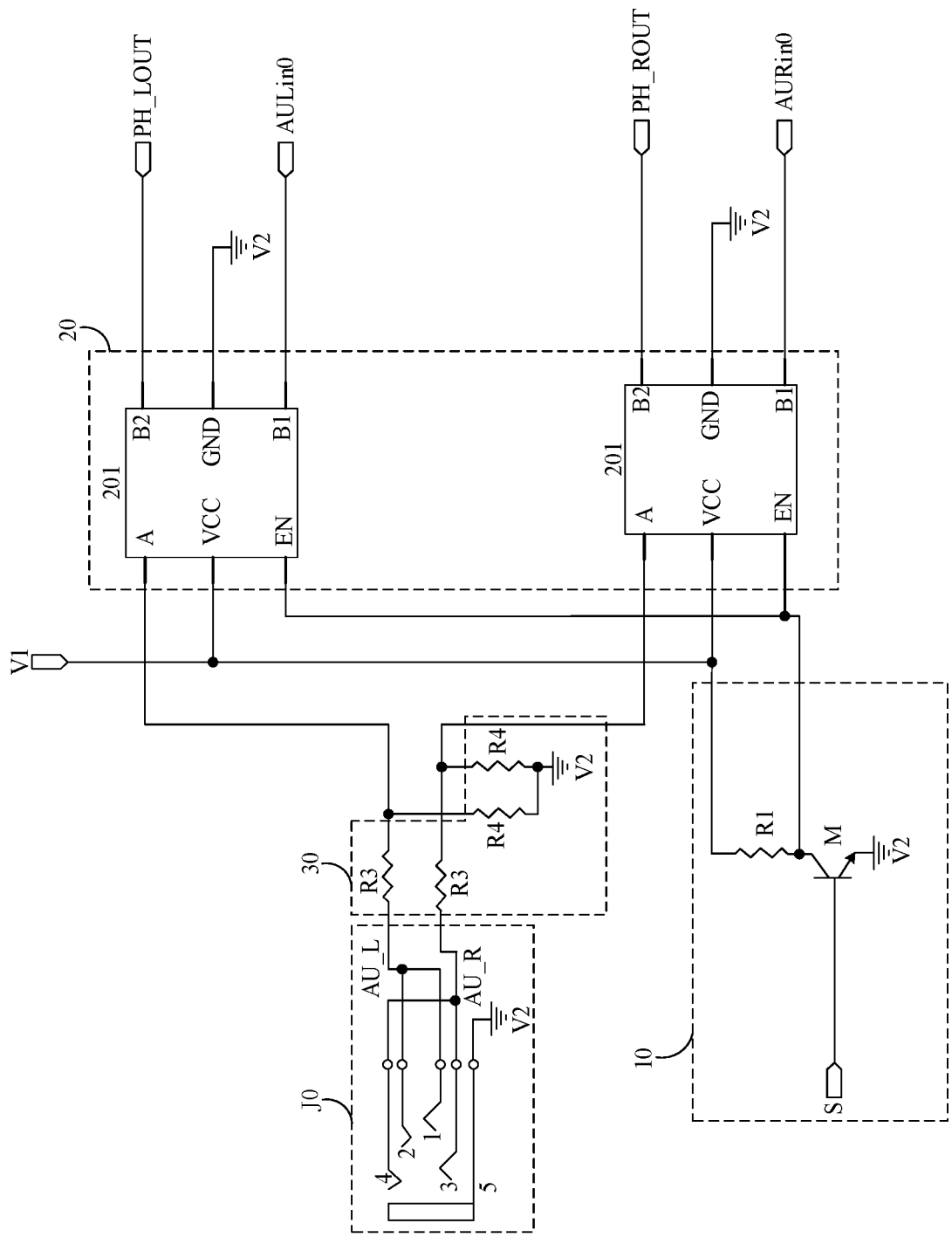
FIG. 4 is a schematic structural diagram of still yet another audio signal interface circuit according to an embodiment of the present disclosure.

FIG. 4 is a schematic structural diagram of still yet another audio signal interface circuit according to an embodiment of the present disclosure. As illustrated in FIG. 4, the audio signal interface J0 may include a left-channel interface AU_L and a right-channel interface AU_R. That is, the audio signal interface J0 may be a dual-channel audio signal interface. Correspondingly, the audio signal input terminal AUin0 may include a left-channel input terminal AULin0 and a right-channel input terminal AURin0, and the audio signal output terminal PH_OUT may include a left-channel output terminal PH_LOUT and a right-channel output terminal PH_ROUT. When the audio signal interface J0 is a dual-channel audio signal interface, referring to FIG. 4, the control sub-circuit 20 may include two control chips 201.

Referring to FIG. 4, it can be known that the output pin B1 of one control chip 201 may be connected to the left-channel input terminal AULin0, the input pin B2 thereof may be connected to the left-channel output terminal PH_LOUT, and the input/output pin A thereof may be connected to the left-channel interface AU_L.

The output pin B1 of the other control chip 201 may be connected to the right-channel input terminal AURin0, the input pin B2 thereof may be connected to the right-channel output terminal PH_ROUT, and the input/output pin A thereof may be connected to the right-channel interface AU_R.

By arranging two control chips 201, the audio signal interface J0 may implement input and output of a dual-channel audio signal, which improves operating flexibility of the audio signal interface circuit and enhances the effect of the transmitted audio signal.

Figure 5:
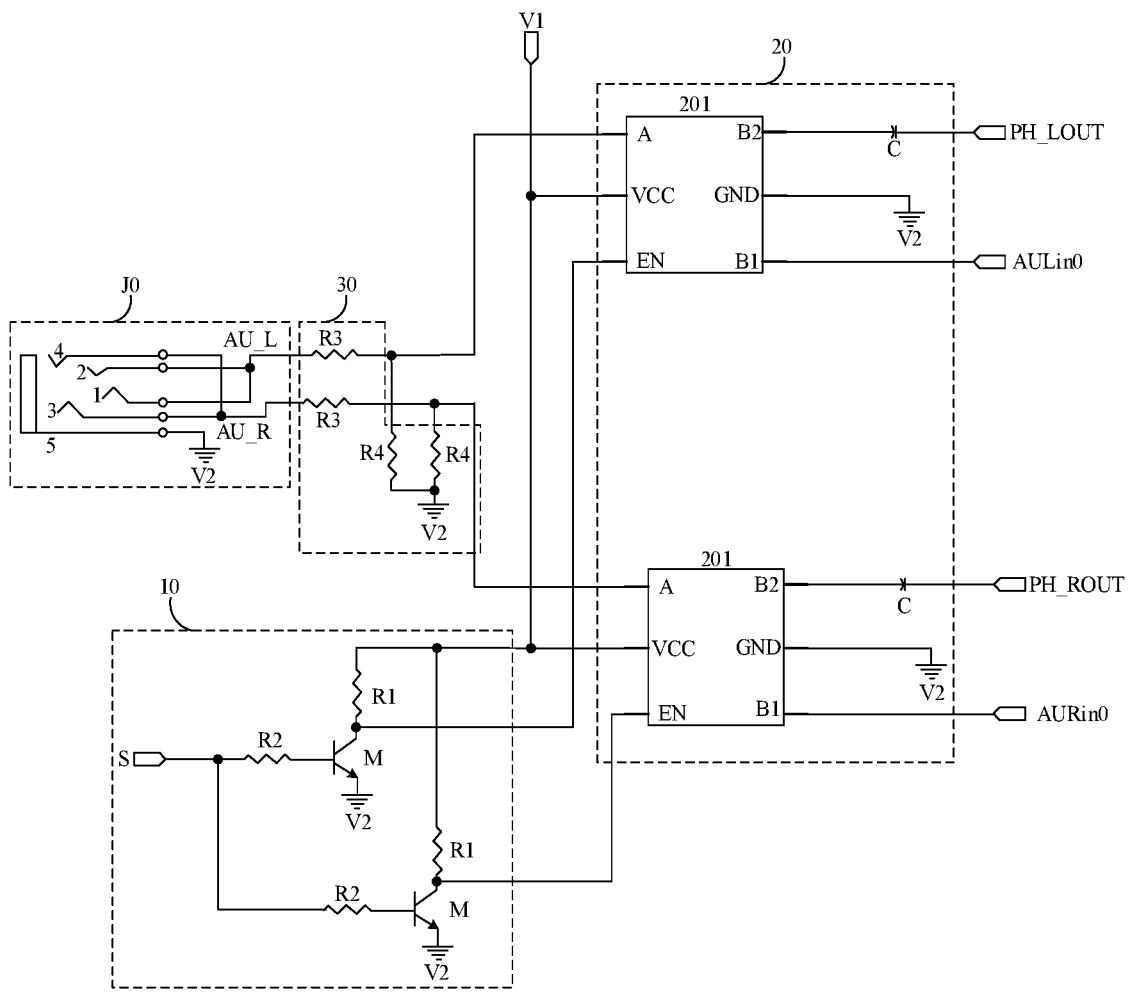
FIG. 5 is a schematic structural diagram of still yet another audio signal interface circuit according to an embodiment of the present disclosure.

FIG. 5 is a schematic structural diagram of still yet another audio signal interface circuit according to an embodiment of the present disclosure. As illustrated in FIG. 5, when the control sub-circuit 20 includes two control chips 201, the control sub-circuit 20 may further include two capacitors C.

One terminal of one capacitor C may be connected to the input pin B2 of one control chip 201, and the other terminal of the capacitor C may be connected to the left-channel audio signal output terminal PH_LOUT.

One terminal of the other capacitor C may be connected to the input pin B2 of the other control chip 201, and the other terminal of the capacitor C may be connected to the right-channel audio signal output terminal PH_ROUT.

By arranging two capacitors C, stability of output of a left-channel audio signal is improved, and stability of output of a right-channel audio signal is also improved.

Optionally, referring to FIG. 2 to FIG. 5, a first power pin VCC of each control chip 201 may be connected to a first power source terminal V1. A second power pin GND of each control chip 201 may be connected to a second power source terminal V2. For example, the second power source terminal V2 may be a ground terminal GND. The first power pin VCC and the second power pin GND may supply power for the control chip 201, such that the control chip 201 normally operates.

Referring to FIG. 2 to FIG. 5, the detection sub-circuit 10 may include a switch transistor M and a first resistor R1.

The gate of the switch transistor M may be connected to the control signal terminal S, and the first electrode of the switch transistor M may be connected to the second power source terminal V2, and the second electrode of the switch transistor may be connected to the control terminal of the control sub-circuit 20. For example, the second electrode of the switch transistor M may be connected to the enable pin EN of the control chip 201.

One terminal of the first resistor R1 may be connected to the second electrode of the switch transistor M, and the other terminal of the first resistor R1 may be connected to the first power source terminal V1.

Optionally, referring to FIG. 3 and FIG. 5, the detection sub-circuit 10 may further include a second resistor R2.

One terminal of the second resistor R2 may be connected to the control signal terminal S, and the other terminal of the second resistor R2 may be connected to the gate of the switch transistor M. That is, the gate of the switch transistor M is connected to the control signal terminal S via the second resistor R2.

The second resistor R2 may be a current limiting resistor. By arranging the second resistor R2, the detection sub-circuit 10 may be protected, and operating stability of the detection sub-circuit 10 is improved.

Optionally, referring to FIG. 3, the detection sub-circuit 10 may include only one switch transistor M, one first resistor R1 and one second resistor R2.

Figure 6:
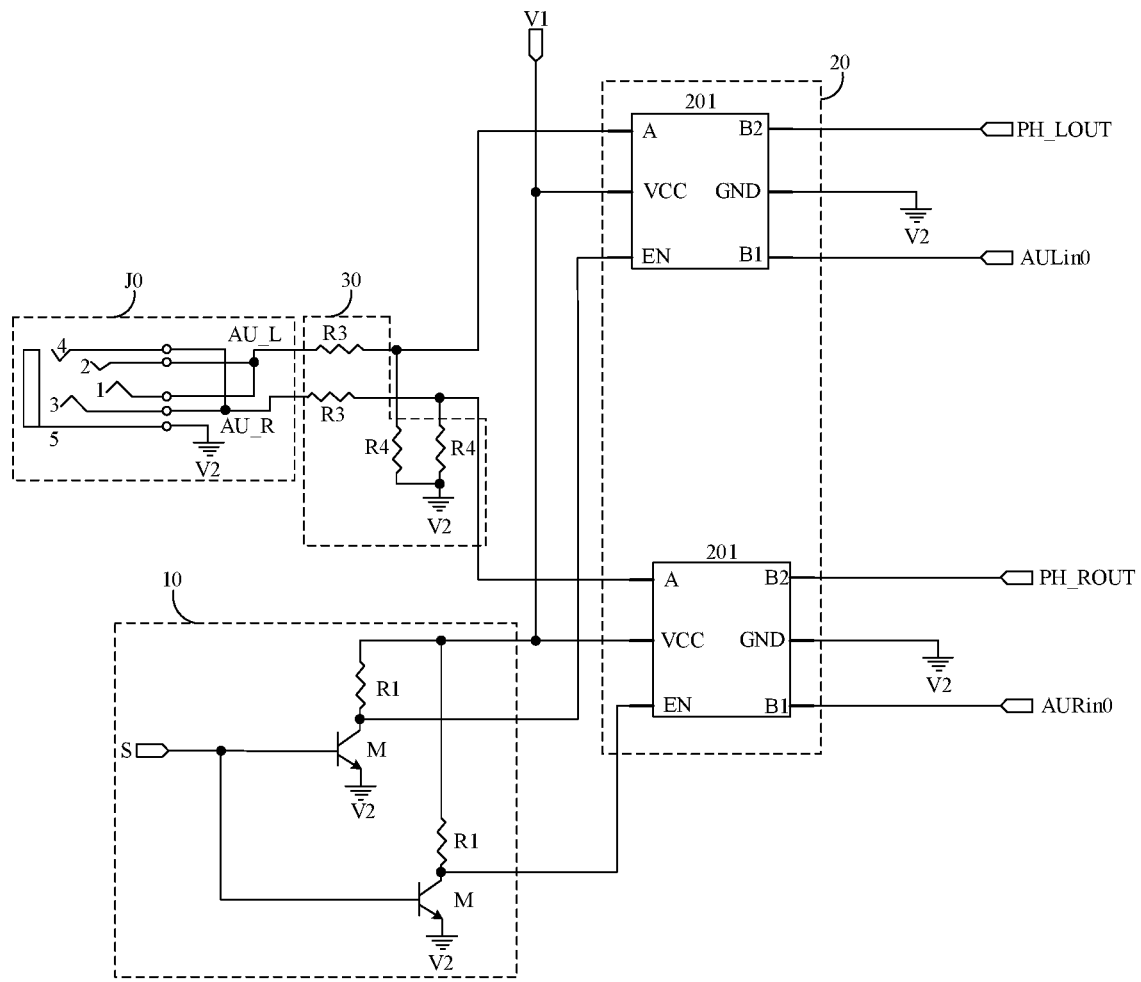
FIG. 6 is a schematic structural diagram of still yet another audio signal interface circuit according to an embodiment of the present disclosure.

Optionally, when the audio signal interface J0 is a dual-channel audio signal interface, as an optional implementation, referring to FIG. 5 and FIG. 6, the detection sub-circuit 10 may include two switch transistors M and two first resistors R1.

The second electrode of one switch transistor M may be connected to the enable pin EN of one control chip 201, and the second electrode of the other switch transistor M may be connected to the enable pin EN of the other control chip 201. One terminal of one first resistor R1 is connected to the second electrode of one switch transistor M, and the other terminal of the first resistor R1 is connected to the first power source terminal V1. One terminal of the other first resistor R1 is connected to the second electrode of the other switch transistor M, and the other terminal of the first resistor R1 is connected to the first power source terminal V1.

By arranging two switch transistors M to control two control chips 201 respectively, operating flexibility and reliability of the detection sub-circuit 10 may be improved.

As another optional implementation, referring to FIG. 4, when the audio signal interface J0 is a dual-channel audio signal interface, the detection sub-circuit 10 may include only one switch transistor M and one first resistor R1. The second electrode of the switch transistor M may be connected to the enable pins EN of the two control chips 201 respectively.

By arranging a switch transistor M to control two control chips 201, cost of the detection sub-circuit 10 may be lowered.

Optionally, when the audio signal interface J0 is a dual-channel audio signal interface, referring to FIG. 5, the detection sub-circuit 10 may further include two second resistors R2.

One second resistor R2 may be connected in series between the control signal terminal S and the gate of one switch transistor M, and the other second resistor R2 may be connected in series between the control signal terminal S and the gate of the other switch transistor M.

In the embodiment of the present disclosure, as illustrated in FIG. 3 to FIG. 6, the audio signal interface circuit may further include an interface sub-circuit 30. The interface sub-circuit 30 may be connected to the input terminal of the control sub-circuit 20 and the audio signal interface J0 respectively. That is, the control sub-circuit 20 may be connected to the audio signal interface J0 via the interface sub-circuit 30. The interface sub-circuit 30 may be configured to implement at least one function of impedance matching and current limiting.

Optionally, as illustrated in FIG. 3, the interface sub-circuit 30 may include a third resistor R3 and a fourth resistor R4.

One terminal of the third resistor R3 may be connected to the audio signal interface J0, and the other terminal of the third resistor R3 may be connected to the input terminal of the control sub-circuit 20 (for example, connected to the input/output pin A of the control chip 201) and one terminal of the fourth resistor R4 respectively. The other terminal of the fourth resistor R4 may be connected to the second power source terminal V2.

When the audio signal interface J0 is a single-channel audio signal interface, as illustrated in FIG. 3, the interface sub-circuit 30 may include only one third resistor R3 and only one fourth resistor R4. Referring to FIG. 3, two pins of the audio signal interface J0 may be connected to one terminal of the third resistor R3, and the other pin thereof may be connected to the second power source terminal V2.

When the audio signal interface J0 is a dual-channel audio signal interface, as illustrated in FIG. 4 to FIG. 6, the interface sub-circuit 30 may include two third resistors R3 and two fourth resistors R4.

One terminal of one third resistor R3 may be connected to the left-channel interface AU_L of the audio signal interface J0, wherein the left-channel interface AU_L is connected to a first pin 1 and a second pin 2 of the audio signal interface J0, and the other terminal of the third resistor R3 may be connected to one terminal of one fourth resistor R4 and the input/output pin A of one control chip 201 respectively.

One terminal of the other third resistor R3 may be connected to the right-channel interface AU_R of the audio signal interface J0, wherein the right-channel interface AU_R is connected to a first pin 3 and a fourth pin 4 of the audio signal interface J0, and the other terminal of the other third resistor R3 may be connected to one terminal of the other fourth resistor R4 and the input/output pin A of the other control chip 201 respectively.

The other terminals of the two fourth resistors R4 may be both connected to the second power source terminal V2.

By arranging an interface sub-circuit 30 including a third resistor R3 and a fourth resistor R4, operating stability of the audio signal interface J0 connected to the interface sub-circuit 30 may be improved.

Exemplarily, in the interface sub-circuit 30, the third resistor R3 may be configured to implement functions of current limiting, electrostatic protection, and exterior interference resistance and the like. The fourth resistor R4 may be configured to implement the function of impedance matching.

Optionally, in the embodiment of the present disclosure, the audio signal interface J0 may be a headphone interface. By controlling communication between the headphone interface and the audio signal input terminal AUin0 or the audio signal output terminal PH_OUT of the decoder chip, the headphone interface not only implements the function of outputting audio signals, but also implements the function of inputting audio signals. Thus, the play effect of the terminal is improved, and the original headphone interface in the terminal is used as the audio signal interface to implement input or output of the audio signals, thereby minimizing the cost.

In the embodiment of the present disclosure, all of the switch transistors included in the detection sub-circuit 10 may be N-type transistors. Correspondingly, the first potential may be a high potential relative to the second potential.

In summary, the embodiment of the present disclosure provides an audio signal interface circuit, wherein the audio signal interface circuit includes a detection sub-circuit and a control sub-circuit. The detection sub-circuit may control, under control of a control signal, the control sub-circuit, such that an audio signal interface is connected to an audio signal input terminal or an audio signal output terminal in a decoder chip. That is, the audio signal interface may not only input an audio signal to the decoder chip via the audio signal interface circuit, but also receive, via the audio signal interface circuit, an audio signal output by the decoder chip. Therefore, where an audio and video signal interface of the terminal fails to receive audio signals or receives signals containing no audio signal, the terminal may further receive the audio signal via the audio signal interface thereof, and output the audio signal to the decoder chip via the audio signal interface circuit, such that the decoder chip may play the audio signal via a loudspeaker, thereby improving the play effect of the terminal. In addition, the technical solution according to the embodiment of the present disclosure may implement input and output of the audio signals only by one audio signal interface, which saves the cost and simplifies the circuit structure.

Figure 7:
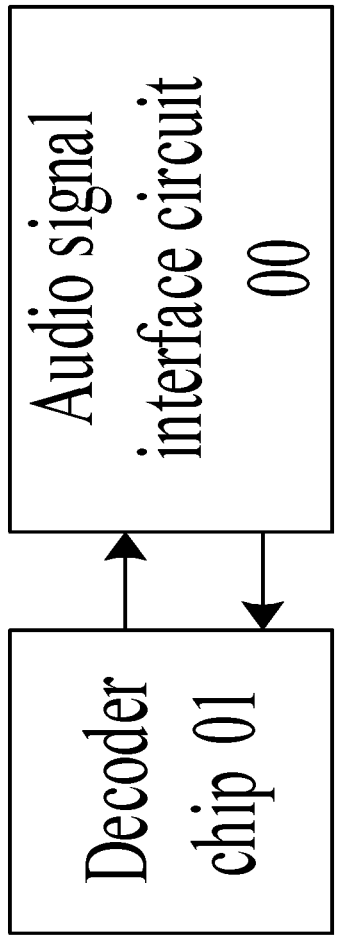
FIG. 7 is a schematic structural diagram of an audio signal interface apparatus according to an embodiment of the present disclosure.

FIG. 7 is a schematic structural diagram of an audio signal interface apparatus according to an embodiment of the present disclosure. As illustrated in FIG. 7, the apparatus may include a decoder chip 01 and an audio signal interface circuit 00 connected to the decoder chip 01, wherein the audio signal interface circuit 00 may be any one of the circuits as illustrated in FIG. 1 to FIG. 6.

In the embodiment of the present disclosure, the decoder chip 01 may be a chip configured to decode audio and video signals. When signals received by the decoder chip 01 include audio signals, the decoder chip 01 may control the audio signal interface circuit 00 to communicate the audio signal interface J0 with an audio signal output terminal of the decoder chip 01, such that the audio signal interface implements the function of outputting audio signals. When signals received by the decoder chip 01 include no audio signal, the decoder chip 01 may control the audio signal interface circuit 00 to communicate the audio signal interface J0 with an audio signal input terminal of the decoder chip 01, such that the audio signal interface implements the function of inputting audio signals.

In summary, the present disclosure provides an audio signal interface apparatus. The audio signal interface apparatus includes a decoder chip and an audio signal interface circuit. The decoder chip may control the audio signal interface circuit, to enable the audio signal interface to be connected to an audio signal input terminal or an audio signal output terminal in the decoder chip. That is, the audio signal interface may not only implement input of audio signals, but also implement output of audio signals. Therefore, the problem that the terminal fails to output the audio signals when the audio and video signal interface of the terminal fails to receive the audio signals or receives signals containing no audio signal is solved, and the play effect of the terminal is improved. In addition, input and output of the audio signals may be implemented only by one audio signal interface, which saves the cost and simplifies the circuit structure.

Figure 8:
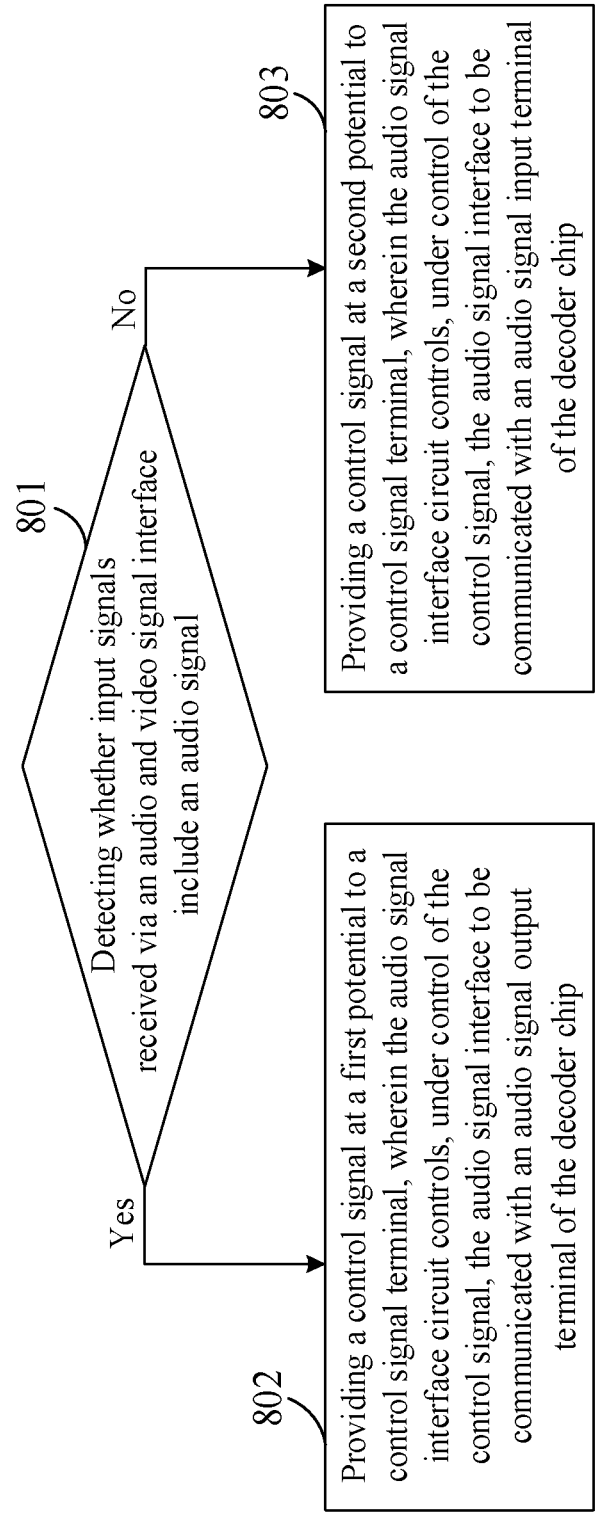
FIG. 8 is a flowchart of a control method of an audio signal interface circuit according to an embodiment of the present disclosure.

FIG. 8 is a flowchart of a control method of an audio signal interface circuit according to an embodiment of the present disclosure. As illustrated in FIG. 8, the method includes the following steps.

In step 801, it is detected whether input signals received via an audio and video signal interface include an audio signal.

In the embodiment of the present disclosure, the input signal may be an audio and video signal input via an audio and video signal interface to a decoder chip. Exemplarily, whether the input signal includes an audio signal may be directly detected by the decoder chip. Alternatively, whether the input signal includes an audio signal may also be detected by other detection circuit that is connected to the decoder chip or the audio and video signal interface.

When the input signal includes an audio signal, step 802 may be performed. When the input signal includes no audio signal, step 803 may be performed.

In step 802, a control signal at a first potential is provided to a control signal terminal, wherein the audio signal interface circuit controls, under control of the control signal, the audio signal interface to be connected to an audio signal output terminal of the decoder chip.

Exemplarily, a detection sub-circuit in the audio signal interface circuit may output, under control of the control signal, a second power source signal from a second power source terminal to the control sub-circuit, and thereby the control sub-circuit may control, under control of the second power source signal, the audio signal interface to be connected to the audio signal output terminal of the decoder chip. In this case, the audio signal interface may output the audio signal from the decoder chip. That is, the audio signal interface may implement the function of outputting the audio signal.

In step 803, a control signal at a second potential is provided to a control signal terminal, wherein the audio signal interface circuit controls, under control of the control signal, the audio signal interface to be connected to an audio signal input terminal of the decoder chip.

Exemplarily, the detection sub-circuit in the audio signal interface circuit may output, under control of the control signal, a first power source signal from a first power source terminal to the control sub-circuit, and thereby the control sub-circuit may control, under control of the first power source signal, the audio signal interface to be connected to the audio signal input terminal of the decoder chip. In this case, the audio signal interface may input the audio signal to the decoder chip. That is, the audio signal interface may implement the function of inputting the audio signal.

Optionally, steps 802 and 803 may be both implemented by the decoder chip.

In summary, the present disclosure provides a control method of an audio signal interface circuit. According to the method, when input signals received by the audio and video signal interface do not include audio signals, a control signal is output to the control signal terminal, such that the audio signal interface may control, under control of the control signal, the audio signal interface to be connected to the audio signal input terminal or the audio signal output terminal of the decoder chip. That is, with the method, the audio signal interface may not only implement input of audio signals, but also implement output of audio signals. Therefore, the problem that the terminal fails to output the audio signals when the audio and video signal interface of the terminal fails to receive the audio signals or receives signals containing no audio signal is solved, and the play effect of the terminal is improved. In addition, input and output of the audio signals may be implemented only by one audio signal interface, which saves the cost and simplifies the circuit structure.

By taking the audio signal interface circuit as illustrated in FIG. 6 and the audio signal interface apparatus as illustrated in FIG. 7 as examples, and by taking the scenario where the transistors in the audio signal interface circuit are N-type transistors and the first potential is a high potential relative to the second potential as an example, the control method of an audio signal interface circuit according to the embodiment of the present disclosure is described hereinafter in detail.

In the embodiment of the present disclosure, when the decoder chip 01 detects that input signals received by the audio and video signal interface include audio signals, a control signal at the first potential, i.e., a high potential, may be output to the control signal terminal S. In this case, the two switch transistors M are both turned on. The second power source terminal V2 may output, via one switch transistor M, a second power source signal to the enable pin of one control chip 201 connected to the switch transistor M. The control chip 201 may control, under control of the second power source signal, the input pin B2 thereof to be connected to the input/output pin A thereof.

Likewise, the second power source terminal V2 may further output, via the other switch transistor M, a second power source signal to the enable pin of the other control chip 201 connected to the switch transistor M. The other control chip 201 may also control, under control of the second power source signal, the input pin B2 thereof to be connected to the input/output pin A thereof. In this case, the decoder chip 01 may output the audio signals to the audio signal interface via the audio signal interface circuit.

When the decoder chip 01 detects that the input signals include no audio signal, a control signal at a second potential, i.e., a low potential, may be output to the control signal terminal S of the detection sub-circuit 10. In this case, the two switch transistors M are both turned off. The first power source terminal V1 may output a first power source signal to the enable pin of one control chip 201 via one first resistor R1. The control chip 201 may control, under control of the first power source signal, the output pin B1 thereof to be connected to the input/output pin A thereof.

Likewise, the first power source terminal V1 may also output a first power source signal to the enable pin of the other control chip 201 via the other first resistor R1. The other control chip 201 may also control, under control of the first power source signal, the output pin B1 thereof to be connected to the input/output pin A thereof. In this case, the audio signal interface may input the audio signals to the decoder chip 01 via the audio signal interface circuit.

For example, Table 1 lists corresponding relations between the potential of the control signals output by the control signal terminal Sand communication state of the pins of the control chip 201. As seen from Table 1, when the potential of the control signal output by the control signal terminal S is high, the communication state of the pins of the control chip 201 is as follow: the input pin B2 is connected to the input/output pin A. When the potential of the control signal output by the control signal terminal S is low, the communication state of the pins of the control chip 201 is as follow: the output pin B1 is connected to the input/output pin A.

TABLE 1

| Potential of control signal terminal S | Communication state of control chip 201 |
| --- | --- |
| S = High | Input pin B2 is communicated with input/output pin A. |
| S = Low | Output pin B1 is communicated with input/output pin A. |

The output pin B1 of one control chip 201 of the two control chips 201 is connected to the left-channel input terminal AULin0, the input pin B2 is connected to the left-channel output terminal PH_LOUT, and the input/output pin A is connected to the left-channel interface AU_L. The output pin B1 of the other control chip 201 is connected to the right-channel input terminal AURin0, and the input pin B2 is connected to the right-channel output terminal PH_ROUT, and the input/output pin A is connected to the right-channel interface AU_R. Therefore, one control chip 201 of the two control chips 201 may control, under control of the first power source signal, the left-channel output terminal PH_LOUT to be connected to the left-channel interface AU_L, and the right-channel input terminal AURin0 to be connected to the right-channel interface AU_R. The other control chip 201 may control, under control of the first power source signal, the right-channel output terminal PH_ROUT to be connected to the right-channel interface AU_R, and the left-channel input terminal AULin0 to be connected to the left-channel interface AU_L. Thus, when the decoder chip 01 detects that the input signals include audio signals, the audio signal interface J0 may implement the left-channel audio signal output function and the right-channel audio signal output function; and when the decoder chip 01 detects that the input signals include no audio signal, the audio signal interface J0 may implement the left-channel audio signal input function and the right-channel audio signal input function.

In summary, the present disclosure provides a control method of an audio signal interface circuit. According to the method, when input signals received by the audio and video signal interface do not include audio signals, a control signal is output to the control signal terminal, such that the audio signal interface circuit may control, under control of the control signal, the audio signal interface to be connected to the audio signal input terminal or the audio signal output terminal of the decoder chip. That is, with the method, the audio signal interface may not only implement input of audio signals, but also implement output of audio signals. Therefore, the problem that the terminal fails to output the audio signals when the audio and video signal interface of the terminal fails to receive the audio signals or receives signals containing no audio signal is solved, and the play effect of the terminal is improved. In addition, input and output of the audio signals may be implemented only by one audio signal interface, which saves the cost and simplifies the circuit structure.

An embodiment of the present disclosure further provides a decoder chip. The decoder chip includes a memory, a processor and computer programs that are stored in the memory and may be executed on the processor. The computer programs, when executed by the processor, may implement the control method of an audio signal interface circuit as described in the above embodiment.

Figure 9:
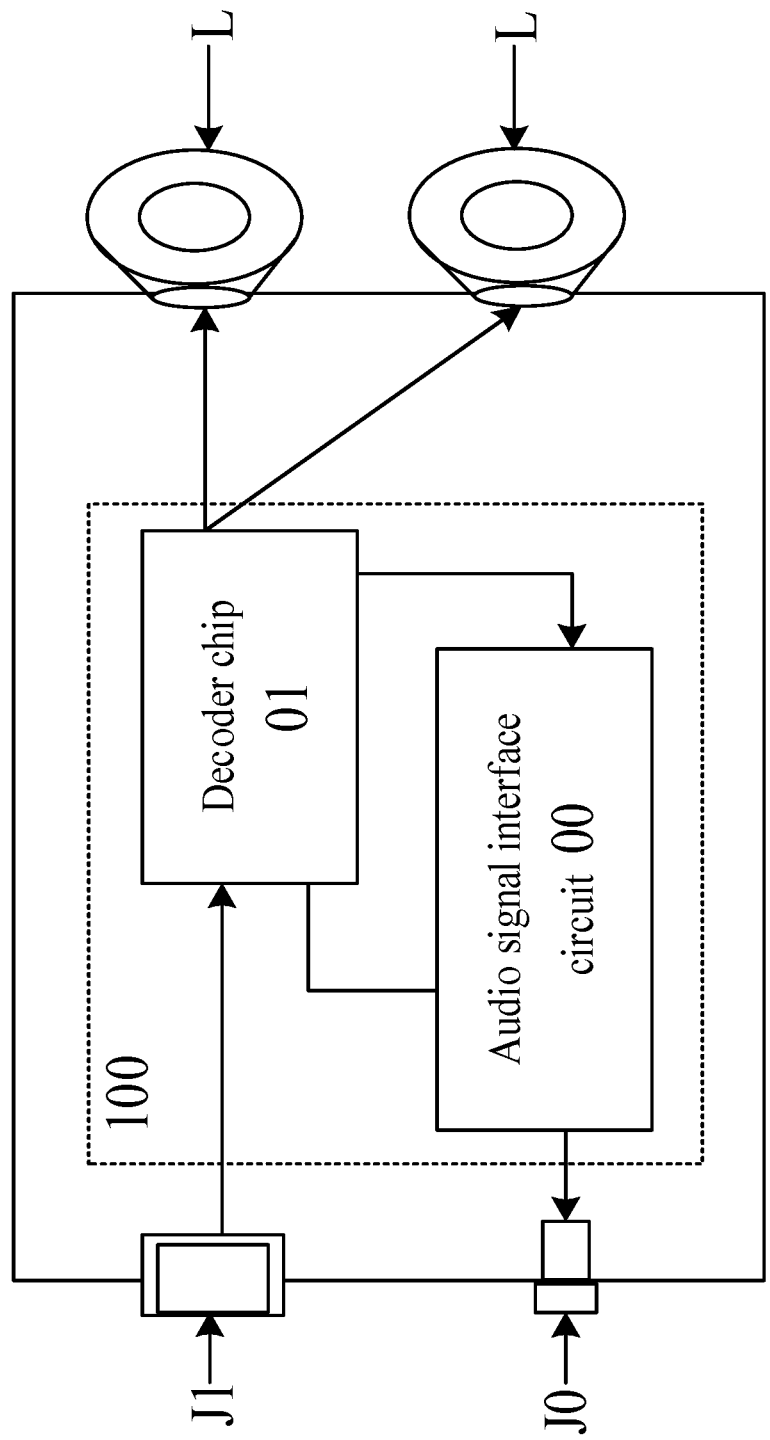
FIG. 9 is a schematic structural diagram of a terminal according to an embodiment of the present disclosure.
Figure 10:
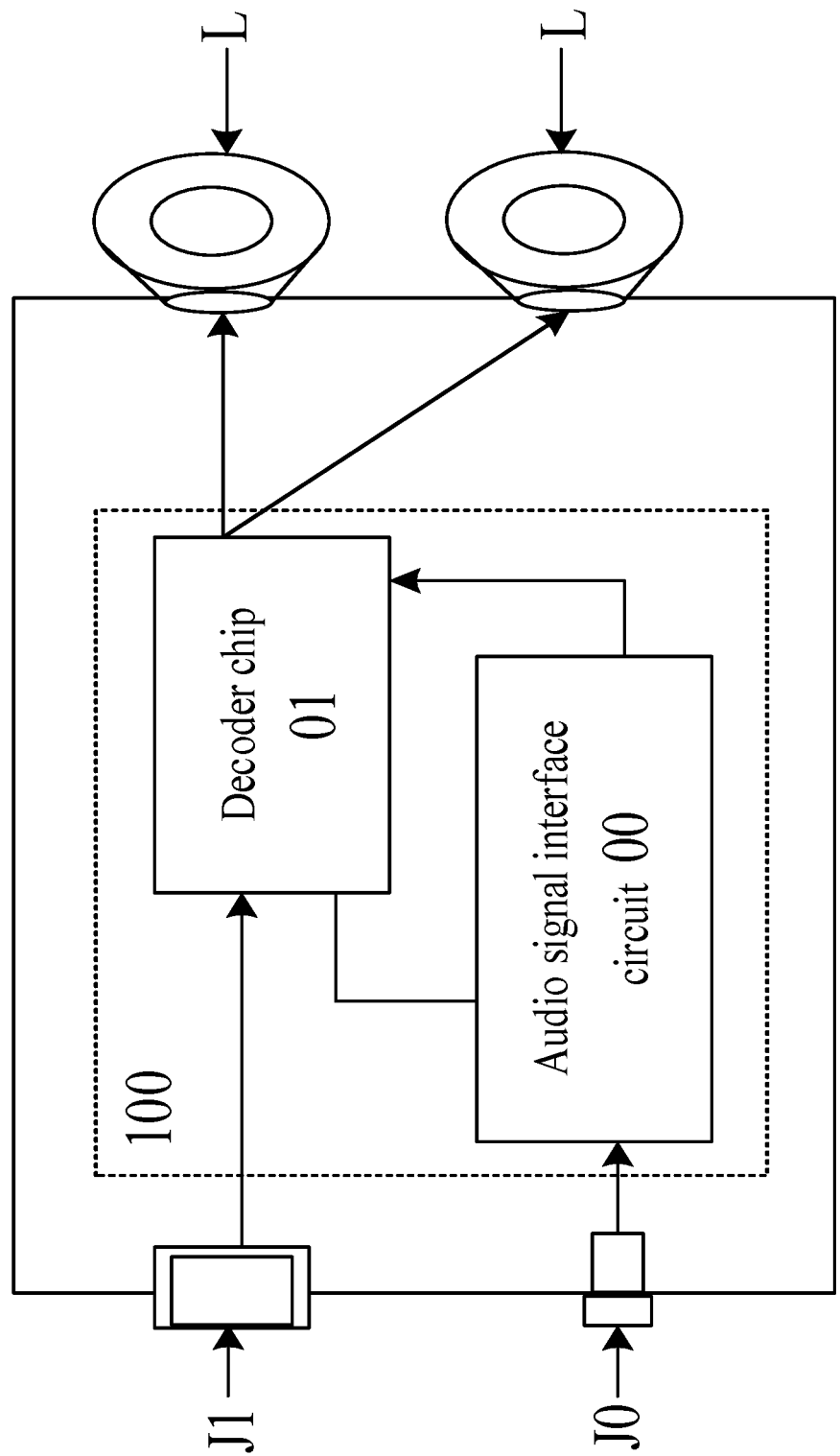
FIG. 10 is a schematic structural diagram of another terminal according to an embodiment of the present disclosure.

FIG. 9 is a schematic structural diagram of a terminal according to an embodiment of the present disclosure. FIG. 10 is a schematic structural diagram of another terminal according to an embodiment of the present disclosure. As illustrated in FIG. 9 and FIG. 10, the terminal may include: an audio signal interface apparatus 100, a loudspeaker L, an audio signal interface J0 and an audio and video signal interface J1. The audio signal interface apparatus 100 may be the audio signal interface apparatus as illustrated in FIG. 7. For example, the terminals as illustrated in FIG. 9 and FIG. 10 both include two loudspeakers L.

Here, the loudspeaker L may be connected to an audio signal output terminal of a decoder chip 01 in the audio signal interface apparatus 100, and the audio and video signal interface J1 may be connected to an audio and video signal input terminal of the decoder chip 01.

Referring to FIG. 7, FIG. 9 and FIG. 10, the audio signal interface apparatus 100 may include a decoder chip 01 and an audio signal interface circuit 00 connected to the decoder chip 01. The audio signal interface circuit 00 may be further connected to the audio signal interface J0. The audio signal interface J0 may be a headphone interface, and the audio and video signal interface J1 may be an HDMI.

In the embodiment of the present disclosure, as illustrated in FIG. 9 and FIG. 10, the audio and video signal interface J1 may firstly transmit received audio and video signals to the decoder chip 01. When the decoder chip 01 detects that the received signals include audio signals, the decoder chip 01 may instruct the audio signal interface circuit 00 to communicate the audio signal interface J0 with the audio signal output terminal of the decoder chip 01. In this case, as illustrated in FIG. 9, the decoder chip 01 may output the decoded audio signals to two loudspeakers L, and output the decoded audio signals to the audio signal interface J0 via the audio signal interface circuit 00.

When the decoder chip 01 detects that the received signals include no audio signal, the decoder chip 01 may instruct the audio signal interface circuit 00 to communicate the audio signal interface J0 with the audio signal input terminal of the decoder chip 01. In this case, as illustrated in FIG. 10, the audio signal interface J0 may transmit the received audio signals to the decoder chip 01 via the audio signal interface circuit 00. The decoder chip 01 may hence decode the received audio signals and output the decoded audio signals to the two loudspeakers L.

Optionally, the terminal may be a play device that is capable of playing the audio signals, for example, device configured with an audio signal interface (for example, a headphone interface) and an audio and video signal interface (for example, an HDMI), such as a vehicle-mounted display, a television or a computer or the like.

In summary, the present disclosure provides a terminal. The terminal includes an audio signal interface apparatus. The audio signal interface apparatus may control an audio signal interface to implement the function of outputting audio signals when input signals received via the audio and video signal interface include the audio signals, and may control an audio signal interface to implement the function of inputting audio signals when input signals received via the audio and video signal interface include no audio signal. Therefore, the problem that the terminal fails to output the audio signals when the audio and video signal interface of the terminal fails to receive the audio signals or receives signals containing no audio signal is solved, and the play effect of the terminal is improved. In addition, input and output of the audio signals may be implemented only by one audio signal interface, which saves the cost and simplifies the circuit structure.

A person skilled in the art would clearly acknowledge that for ease and brevity of description, the specific operating processes of the above described audio signal interface circuit, the audio signal interface apparatus and the terminal may be made reference to the corresponding processes in the above described method embodiments, which are thus not described herein any further.

The foregoing descriptions are merely exemplary embodiments of the present disclosure, and are not intended to limit the present disclosure. Within the spirit and principles of the disclosure, any modifications, equivalent substitutions, improvements, etc., are within the protection scope of the present disclosure.

What is claimed is:

1. An audio signal interface circuit, comprising: a detection sub-circuit and a control sub-circuit; wherein
the detection sub-circuit is connected to a control signal terminal, a first power source terminal, a second power source terminal and a control terminal of the control sub-circuit respectively, and the detection sub-circuit is configured to, under control of a control signal provided by the control signal terminal, output a first power source signal from the first power source terminal or a second power source signal from the second power source terminal to the control terminal of the control sub-circuit; and
the control sub-circuit is further connected to an audio signal interface, and an audio signal input terminal and an audio signal output terminal of a decoder chip respectively, and the control sub-circuit is configured to control the audio signal interface to be connected to the audio signal input terminal under control of the first source power signal, and control the audio signal interface to be connected to the audio signal output terminal under control of the second power source signal.

2. The circuit according to claim 1, wherein the control sub-circuit comprises: at least one control chip; wherein
an input/output pin of the control chip is connected to the audio signal interface;
an output pin of the control chip is connected to the audio signal input terminal, and an input pin of the control chip is connected to the audio signal output terminal; and
an enable pin of the control chip is connected to an output terminal of the detection sub-circuit as the control terminal.

3. The circuit according to claim 2, wherein the control sub-circuit further comprises: at least one capacitor in a one-to-one correspondence with the at least one control chip;
wherein one terminal of each of the at least one capacitor is connected to the input pin of the corresponding control chip, and the other terminal of each of the at least one capacitor is connected to the audio signal output terminal.

4. The circuit according to claim 2, wherein the audio signal interface comprises a left-channel interface and a right-channel interface; the audio signal input terminal comprises a left-channel input terminal and a right-channel input terminal, and the audio signal output terminal comprises a left-channel output terminal and a right-channel output terminal; and the control sub-circuit comprises two control chips;
wherein the input/output pin of one of the control chips is connected to the left-channel interface, and the output pin of the control chip is connected to the left-channel input terminal, and the input terminal of the control chip is connected to the left-channel output terminal; and
the input/output pin of the other of the control chips is connected to the right-channel interface, and the output pin of the control chip is connected to the right-channel input terminal, and the input pin of the control chip is connected to the right-channel output terminal.

5. The circuit according to claim 2, wherein
a first power source pin of the control chip is connected to the first power source terminal, and a second power source pin of the control chip is connected to the second power source terminal.

6. The circuit according to claim 1, wherein the detection sub-circuit comprises: a switch transistor and a first resistor; wherein
a gate of the switch transistor is connected to the control signal terminal, a first electrode of the switch transistor is connected to the second power source terminal, and a second electrode of the switch transistor is connected to the control terminal of the control sub-circuit; and one terminal of the first resistor is connected to the second electrode of the switch transistor, and the other terminal of the first resistor is connected to the first power source terminal;

wherein the first electrode and the second electrode are one of a source and a drain, respectively.

7. The circuit according to claim 6, wherein the detection sub-circuit comprises: a second resistor; wherein one terminal of the second resistor is connected to the control signal terminal, and the other terminal of the second resistor is connected to the gate of the switch transistor.

8. The circuit according to claim 6, wherein the control sub-circuit comprises two control chips; and the detection sub-circuit comprises two switch transistors;

wherein the second electrode of one of the switch transistors is connected to the enable pin of one of the control chips, and the second electrode of the other of the switch transistors is connected to the enable pin of the other of the control chips.

9. The circuit according to claim 1, further comprising: an interface sub-circuit;

wherein the interface sub-circuit is connected to the input terminal of the control sub-circuit and the audio signal interface respectively, and is configured to implement at least one of functions of impedance matching and current limiting.

10. The circuit according to claim 9, wherein the interface sub-circuit comprises: a third resistor and a fourth resistor; wherein one terminal of the third resistor is connected to the audio signal interface, and the other terminal of the third resistor is connected to the input terminal of the control sub-circuit and one terminal of the fourth resistor; and the other terminal of the fourth resistor is connected to the second power source terminal.

11. The circuit according to claim 10, wherein the audio signal interface comprises: a left-channel interface and a right-channel interface; the control sub-circuit comprises: two control chips; and the interface sub-circuit comprises: two third resistors and two fourth resistors; wherein one terminal of one of the third resistors is connected to the left-channel interface, and the other terminal of the third resistor is connected to the input/output chip of one of the control chips and one terminal of one of the fourth resistors respectively; and one terminal of the other of the third resistors is connected to the right-channel interface, and the other terminal of the third resistor is connected to the input/output chip of the other of the control chips and one terminal of the other of the fourth resistors respectively.

12. The circuit according to claim 11, wherein the detection sub-circuit comprises: two switch transistors, two first resistors and two second resistors; and the control sub-circuit further comprises: two capacitors; wherein a gate of one of the switch transistors is connected to the control signal terminal via one of the second resistors, a first electrode of the switch transistor is connected to the second power source terminal, and a second electrode of the switch transistor is connected to an enable pin of one of the control chips and is connected to the first power source terminal via one of the first resistors;

a gate of the other of the switch transistors is connected to the control signal terminal via the other of the second resistors, a first electrode of the switch transistor is connected to the second power source terminal, and a second electrode of the switch transistor is connected to an enable pin of the other of the control chips and is connected to the first power source terminal via the other of the first resistors;

one terminal of one of the capacitors is connected to an input pin of one of the control chips, and the other terminal of the capacitor is connected to the left-channel output terminal of the audio signal output terminal; and one terminal of the other of the capacitors is connected to an input pin of the other of the control chips, and the other terminal of the capacitor is connected to the right-channel output terminal of the audio signal output terminal;

wherein the first electrode and the second electrode are one of a source and a drain, respectively.

13. A control method of an audio signal interface circuit, comprising:

detecting whether input signals received via an audio and video signal interface comprise an audio signal;

providing a control signal at a first potential to a control signal terminal when the input signals comprise an audio signal, wherein the audio signal interface circuit controls, under control of the control signal, an audio signal interface to be connected to an audio signal output terminal of a decoder chip; and providing a control signal at a second potential to the control signal terminal when the input signals do not comprise audio signals, wherein the audio signal interface circuit controls, under control of the control signal, the audio signal interface to be connected to an audio signal input terminal of the decoder chip.

14. A decoder chip, comprising: a memory, a processor and computer programs that is stored in the memory and executable by the processor; wherein the computer programs, when executed by the processor, implement the method of claim 13.

15. An audio signal interface apparatus, comprising: a decoder chip, and an audio signal interface circuit connected to the decoder chip; wherein the audio signal interface circuit comprises: a detection sub-circuit and a control sub-circuit; wherein the detection sub-circuit is connected to a control signal terminal, a first power source terminal, a second power source terminal and a control terminal of the control sub-circuit respectively, and the detection sub-circuit is configured to, under control of a control signal provided by the control signal terminal, output a first power source signal from the first power source terminal or a second power source signal from the second power source terminal to the control terminal of the control sub-circuit; and the control sub-circuit is further connected to an audio signal interface, and an audio signal input terminal and an audio signal output terminal of a decoder chip respectively, and the control sub-circuit is configured to control the audio signal interface to be connected to the audio signal input terminal under control of the first power source signal, and control the audio signal interface to be connected to the audio signal output terminal under control of the second power source signal.

16. The apparatus according to claim 15, wherein the decoder chip is configured to:

detect whether input signals received via an audio and video signal interface comprises an audio signal; provide a control signal at a first potential to the control signal terminal when the input signals comprise audio signals; and provide a control signal at a second potential to the control signal terminal when the input signals do not comprise audio signals.

17. The apparatus according to claim 15, wherein the audio signal interface comprises a left-channel interface and a right-channel interface; the audio signal input terminal comprises a left-channel input terminal and a right-channel input terminal, and the audio signal output terminal comprises a left-channel output terminal and a right-channel output terminal; and the control sub-circuit comprises two control chips; wherein an output pin of one of the control chips is connected to the left-channel input terminal, and an input pin of the control chip is connected to the left-channel output terminal, and an input/output pin of the control chip is connected to the left-channel interface; and an output pin of the other of the control chips is connected to the right-channel input terminal, and an input pin of the control chip is connected to the right-channel output terminal, and an input/output pin of the control chip is connected to the right-channel interface.

18. The apparatus according to claim 15, wherein the detection sub-circuit comprises: a switch transistor and a first resistor; wherein a gate of the switch transistor is connected to the control signal terminal, a first electrode of the switch transistor is connected to the second power source terminal, and a second electrode of the switch transistor is connected to the control sub-circuit; and one terminal of the first resistor is connected to the second electrode of the switch transistor, and the other terminal of the first resistor is connected to the first power source terminal.

19. A terminal, comprising: the audio signal interface apparatus of claim 15, a loudspeaker, an audio signal interface and an audio and video signal interface; wherein the loudspeaker is connected to an audio signal output terminal of a decoder chip in the audio signal interface apparatus; and the audio and video signal interface is connected to an audio and video signal input terminal of the decoder chip.

20. The terminal according to claim 19, wherein the terminal is a vehicle-mounted display device.

21. An audio signal interface circuit, comprising: a detection sub-circuit and a control sub-circuit; wherein the detection sub-circuit is connected to a control signal terminal, a first power source terminal, a second power source terminal and a control terminal of the control sub-circuit respectively, and the detection sub-circuit is configured to, under control of a control signal provided by the control signal terminal, output a first power source signal from the first power source terminal or a second power source signal from the second power source terminal to the control terminal of the control sub-circuit;

the control sub-circuit is further connected to an audio signal interface, and to an audio signal input terminal and an audio signal output terminal of a decoder chip, and the control sub-circuit is configured to control the audio signal interface to be connected to the audio signal input terminal under control of the first source power signal, and control the audio signal interface to be connected to the audio signal output terminal under control of the second power source signal; and an interface sub-circuit connected to the input terminal of the control sub-circuit and the audio signal interface respectively, the interface sub-circuit comprising at least one resistor positioned therebetween, and configured to implement at least one of functions of impedance matching and current limiting.

* * * * *